(12) United States Patent
Sykes

(10) Patent No.: US 8,704,129 B2
(45) Date of Patent: Apr. 22, 2014

(54) POSITIONING DEVICE

(75) Inventor: Neil Sykes, Yarnton (GB)

(73) Assignee: Tel Solar AG, Truebbach (CH)

( * ) Notice: Subject to any disclaimer, the term of this patent is extended or adjusted under 35 U.S.C. 154(b) by 1534 days.

(21) Appl. No.: 11/792,653

(22) PCT Filed: Dec. 12, 2005

(86) PCT No.: PCT/GB2005/004763
§ 371 (c)(1),
(2), (4) Date: Dec. 12, 2007

(87) PCT Pub. No.: WO2006/061649
PCT Pub. Date: Jun. 15, 2006

(65) Prior Publication Data
US 2008/0149605 A1 Jun. 26, 2008

(30) Foreign Application Priority Data
Dec. 10, 2004 (GB) .................................. 0427104.5

(51) Int. Cl.
*B23K 26/00* (2006.01)
(52) U.S. Cl.
USPC ............. 219/121.73; 219/121.67; 219/121.75
(58) Field of Classification Search
CPC ...................................................... B23K 20/00
USPC ............. 219/121.73, 121.82, 121.75, 121.72, 219/121.68, 121.67, 121.6
See application file for complete search history.

(56) References Cited

U.S. PATENT DOCUMENTS

| | | | | |
|---|---|---|---|---|
| 3,626,141 A | * | 12/1971 | Daly | 219/121.68 |
| 3,789,320 A | * | 1/1974 | Hepburn | 372/58 |
| 4,137,988 A | | 2/1979 | Croix-Marie | |
| 4,201,905 A | * | 5/1980 | Clark et al. | 219/121.6 |
| 4,229,709 A | * | 10/1980 | McMahan | 372/59 |
| 4,316,157 A | * | 2/1982 | Dosi et al. | 372/59 |
| RE31,042 E | * | 9/1982 | Clark et al. | 219/121.67 |
| 4,544,824 A | * | 10/1985 | Knutsson | 219/121.67 |
| 4,550,241 A | | 10/1985 | Scott et al. | |
| 4,563,567 A | | 1/1986 | Geffroy et al. | |
| 4,675,497 A | * | 6/1987 | Pearl et al. | 219/121.67 |

(Continued)

FOREIGN PATENT DOCUMENTS

| | | |
|---|---|---|
| DE | 41 04 344 A1 | 9/1991 |
| DE | 42 34 788 A1 | 4/1994 |
| DE | 10 2004 009 950 A1 | 9/2005 |
| GB | 03077237 | 4/2003 |

(Continued)

*Primary Examiner* — Mark H Paschall
(74) *Attorney, Agent, or Firm* — Davis & Bujold, PLLC; Michael J. Bujold

(57) ABSTRACT

A positioning device of the type described characterised by the incorporation of the puck into a closed circuit gas system from which the puck establishes the flow of fluid to provide the fluid cushion. Typically the positioning device is characterised by the provision of a heat transfer mechanism incorporated in the closed circuit to provide for heat exchange between the heat transfer mechanism and gas flowing around the system. The puck is coupled to a lens and a mask to provide for close following of a surface of a work-piece so as to keep a magnified image of the mask stable; the combination of puck, lens and mask forming a unit counterbalanced by a counterweight acting to provide for adjustment of focus of the laser beam relative to the surface of the work-piece.

16 Claims, 4 Drawing Sheets

(56) References Cited

U.S. PATENT DOCUMENTS

| | | | |
|---|---|---|---|
| 4,878,127 A * | 10/1989 | Zollman et al. | 358/3.32 |
| 5,061,839 A | 10/1991 | Matsuno et al. | |
| 6,467,922 B1 | 10/2002 | Blanc et al. | |
| 7,371,993 B2 * | 5/2008 | Bann et al. | 219/121.69 |
| 2002/0125231 A1 | 9/2002 | Hunter et al. | |
| 2004/0207824 A1 | 10/2004 | Lof et al. | |

FOREIGN PATENT DOCUMENTS

| | | |
|---|---|---|
| GB | 2 400 063 | 10/2004 |
| JP | 03060890 | 3/1991 |
| JP | 11-162831 A | 6/1999 |
| JP | 2001269788 | 10/2001 |
| JP | 2004-289126 A | 10/2004 |
| WO | WO 2004/087363 | 10/2004 |

* cited by examiner

POSITIONING DEVICE

This application is a national stage completion of PCT/GB2005/004763 filed Dec. 12, 2005 which claims priority from British Application Serial No. 0427104.5 filed Dec. 10, 2004.

FIELD OF THE INVENTION

This invention relates to a positioning device.

BACKGROUND OF THE INVENTION

In our co-pending GB Application 03077237 (the 'Prior Application') there is described a 'Positioning method and apparatus and a product thereof'. In its broadest method aspect the Prior Application provides a method of micro-machining, by means of a laser, a work piece comprising the steps of: locating the work piece on a carrier forming a part of a transport system whereby the carrier can be displaced along a path parallel to an X-axis of the work piece, a Y-axis lying transverse the path, and a Z-axis lying transverse the path; causing an output beam from the laser to establish a datum position relative to the X, Y and Z axis of a work piece and displacing the work piece along the path by way of the transport system so as to enable the work-piece to be subject to micro-machining process by way of the laser characterised by the steps of: maintaining distance between the datum position and a location on a surface of the work piece in the vicinity of the datum position; and accommodating local variations in thickness of the work piece so that the datum position is maintained at a fixed distance relative to a surface of the work piece.

The Prior Application goes on to formulate that the step of accommodating local variation in thickness in the work piece by displacing the datum position to follow the surface of the work piece. It goes on to envisage that the step of maintaining distance is undertaken by means of a distance sensing device comprising a body member riding on a fluid cushion on a first surface of the work piece the fluid cushion being established by a flow of fluid fed from the body member so as to maintain the body member at a predetermined distance from first surface; and in the event the body member is displaced from a current position of the body member due to a variation in thickness of the work piece any change in position of the body member perpendicular to the first surface is used to move the focussing or imaging lens to cause a corresponding change in the current datum position so as to restore the working datum position to its predetermined distance relative to the first surface of the work piece. Hereinafter such a device is referred to as being 'of the type described'. Preferably the body member is located relative to a first side of the work piece and a further body member is provided located relative to a second side of the work piece on the opposite side of the work piece to the first side and the further body member serves to urge the work piece towards the body member when a local thickness of the work piece is reduced.

This concept of a distance sensing device comprising a body member riding over a surface of a work piece to be micro machined has now been developed further. Hereafter such a distance sensing device is referred to as a 'puck'.

SUMMARY OF THE INVENTION

According to the present invention there is provided a positioning device of the type described characterised by the incorporation of the puck into a closed circuit gas system from which the puck establishes the flow of fluid to provide the fluid cushion.

According to a first preferred version of the present invention the positioning device is characterised by the provision of a heat transfer means incorporated in the closed circuit to provide for heat exchange between the heat transfer means and gas flowing around the system.

According to a second preferred version of the present invention or of the first preferred version thereof the puck is coupled to a lens and a mask to provide for close following of a surface of a work-piece so as to keep a magnified image of the mask stable; the combination of puck, lens and mask forming a unit counterbalanced by a counterweight acting to provide for adjustment of focus of the laser beam relative to the surface of the work piece.

According to a third preferred version of the present invention or of the preceding preferred versions thereof the puck includes a column supporting a lens unit above the surface of a work piece; the column being fed gas from the closed circuit gas system; the column being provided with an aperture at the foot of the column so as to support the puck at a closely specified clearance above the work piece; the lens unit providing for the focussing of the laser beam at a point on the surface of the work piece. Typically the puck incorporates a further column which in combination with the column serves to support the lens unit above the surface of a work piece; the further column being fed gas from the closed circuit gas system; the further column being provided with an aperture at the foot of the further column; the column and the further column in combination serving to support the puck at a closely specified clearance above the work piece; the lens unit providing for the focussing of the laser beam at a point on the surface of the work piece.

According to a fourth preferred version of the present invention or of any preceding preferred version thereof the puck is provided with a further inlet pipe for a gas flow and further outlet pipe for an extraction flow to provide for extraction from the puck separately from the closed circuit gas system.

According to a fifth preferred version of the present invention or of any preceding preferred version thereof the closed circuit gas flow system is fed into and passes out of the puck by means of at least two inlets and two outlets.

According to a sixth preferred version of the present invention or of any preceding preferred version thereof positioning device as claimed in any preceding claim having a puck incorporating an electrostatic device for positioning close to a surface of a work-piece. Typically the puck is fabricated from an insulating material.

According to a seventh preferred version of the present invention or of any preceding preferred version thereof the puck incorporates a contact mask at a very small distance (micron level) from the work-piece 103.

According to an eighth preferred version of the present invention or of any preceding preferred version thereof the puck has an underside shaped to closely correspond to a curved surface of a work piece so as to cause the puck to float relative to the surface of the work piece by the gas flow of air so as to enable the puck to compensate for manufacturing errors in the work piece.

The term 'gas' includes gases, vapours or mixtures of gases and vapours and air.

BRIEF DESCRIPTION OF THE DRAWINGS

A number of exemplary embodiments of the body member will now be described with reference to the accompanying FIG. 1 and FIGS. 2 to 11.

DETAILED DESCRIPTION OF THE INVENTION

Figure 1:
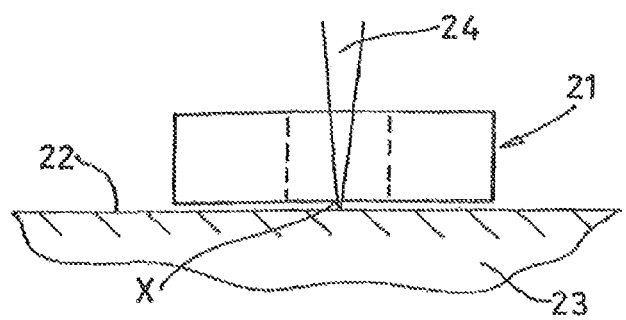
FIG. 1 is a diagram showing features of the puck the subject of the Earlier Application.
Figure 2:
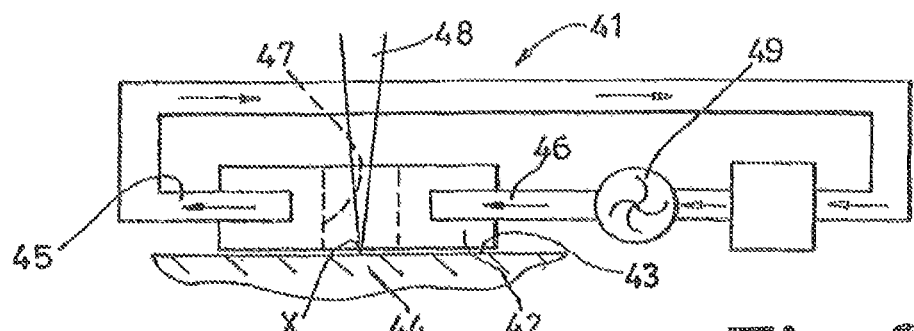
FIGS. 2 to 11 which show diagrammatically a range of types of puck applications and developments as currently proposed for use in relation to microwave machining.
Figure 3:
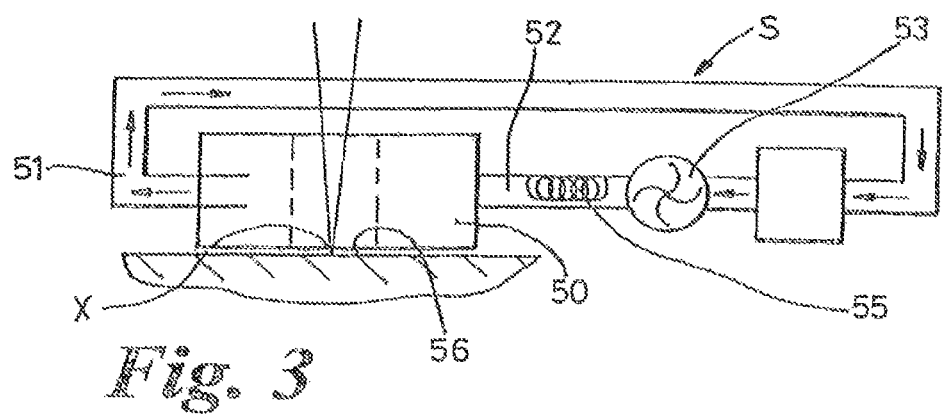
Figure 4:
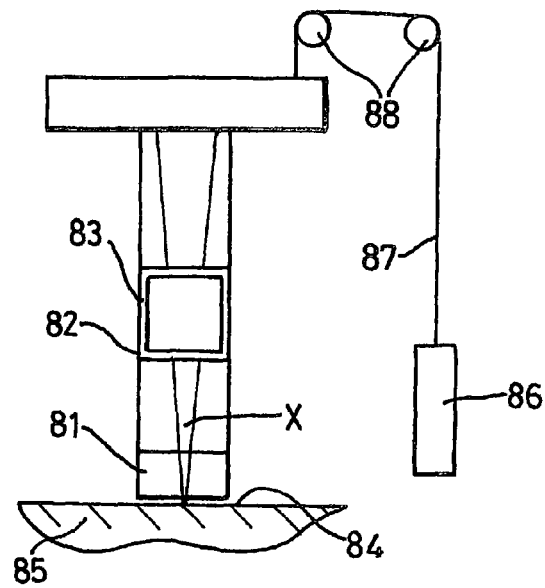
Figure 5:
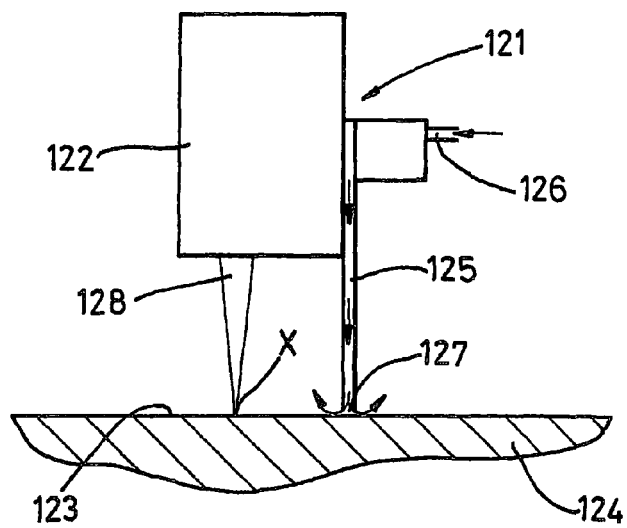

In most examples there is shown a puck which has an openwork central region through which a beam from the machining laser is directed. To keep the diagram simple in some cases the openwork region and the laser beam are omitted.

FIG. 1

This show the puck concept as envisaged in the Prior Application. Puck 21 is located over a flat surface 22 of a work piece 23 to provide for micro machining of the surface 22 by means of an associated laser beam 24 focussed at point X.

FIG. 2

A closed circuit gas system 41 provides for high concentrations of purging or assisting gases to be passed by way of puck 42 over a region 43 of a work-piece 44. The gas system comprises tubes 45, 46 (extending from a pump 49) for feeding gas into, and extracting it from, puck 42. A gas/vapour such as nitrogen, oxygen, helium or air or something more chemically active can be circulated through the puck 42. The puck 42 is provided with a central aperture 47 through which a laser beam 48 is focussed at point X on work piece 44. The system can be provided with a means for topping up gas so overcoming the effect of small losses. The arrangement shown would be particularly useful for dangerous or environmentally damaging or expensive gases as the total volume of gas required for circulation is relatively low.

FIG. 3

Figure 6:
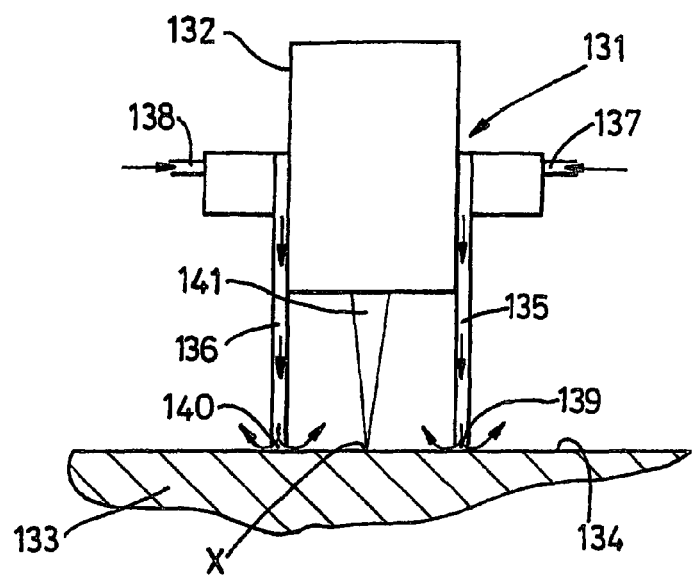

This system S is similar to that of FIG. 6 with flow loop comprising a puck 50 coupled by pipes 51, 52 to a pump 53. There is further provided in the loop a unit 55 to provide for gas treatment to the flow entering the machining area 56. This could provide for surface heating, cooling, drying, wetting or ionizing. A second loop could be used in conjunction with system S to allow for combinations of action such as wetting at the machining area followed by drying immediately outside the area.

FIG. 4

A puck 81 is coupled to a lens 82 and a mask 83 providing for close following of the surface 84 of work-piece 85 so as to keep the magnified image of mask 83 stable. The combination of puck 81, lens 82 and mask 83 can be readily counterbalanced by counterweight 86, acting by a line 87 passing around pulleys 88, to provide for adjustment of focus of laser beam X relative to the surface 84 of the work-piece 85.

FIG. 5

A column puck 121 supports a lens unit 122 above surface 123 of work piece 124. Column 125 is fed air by way of inlet 126 which passes out of aperture 127 at the foot of the column 125 by way of a gap so as to support the column puck 121 at a closely specified clearance above the work piece 124. The lens unit 122 provides for the focussing of laser beam 128 at point X on the surface 123.

FIG. 6

Figure 11:
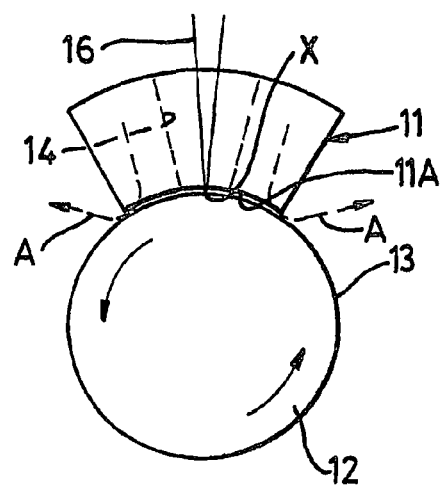

A column puck 131 amounts to a duplicated version of the column puck described in connection with FIG. 11 In this case columns 135, 136 are mounted on opposite sides of lens unit 132. Column 135 (136) is fed air by way of inlet 137 (138) which passes out of aperture 139 (140) at the foot of the column 135 (136) by way of a gap so as to support the column puck 131 at a closely specified clearance above upper surface 134 of work piece 133. The lens unit 132 provides for the focussing of laser beam 141 at point X on the surface 133.

FIG. 7

Puck 91 has an inlet pipe 92 for a gas flow and outlet pipe 93 for an extraction flow to promote drying.

FIG. 8

Figure 7:
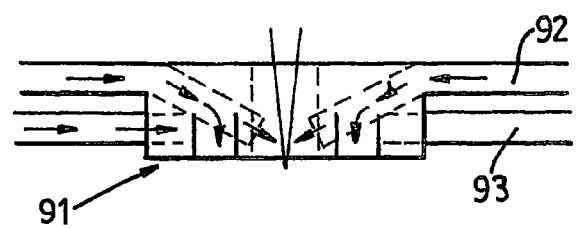
Figure 8:
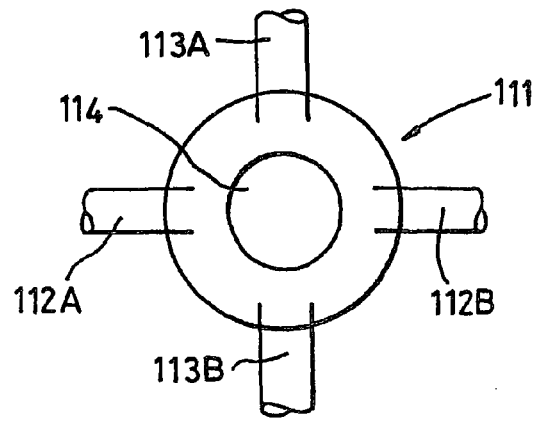
Figure 9:
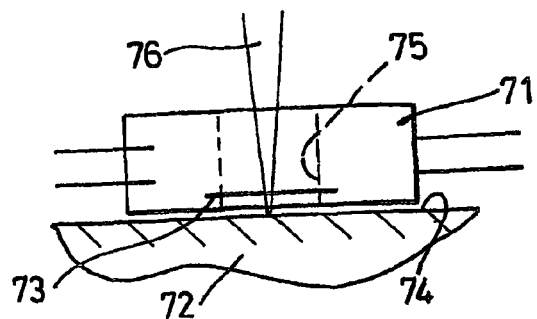
Figure 10:
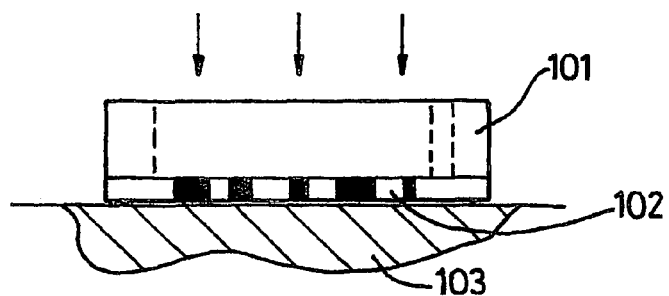

A puck 111 is shown in plan view fed gas by two pairs of pipes 112A, 112B and 113A, 113B to provide for switching the direction of the puck 111 during a machining operation. The puck 111 has central aperture 114 through which a laser beam can be directed and focussed onto a work piece to be machined. Such an arrangement could be used in conjunction with the systems outline in connection with FIGS. 6 or 7. The proposed arrangement can also provide for debris extraction or for changing or guiding flow of debris.

FIG. 9

A puck 71 is used to position an electrostatic device 73 very close to surface 74 of a work-piece 72. For this purpose the puck 71 is fabricated from an insulating material. The puck 71 has an open central region 75 thought which laser beam 76 is focussed on surface 74.

FIG. 10

Puck 101 serves to locate a contact mask 102 at a very small distance (micron level upwards) from a work-piece 103. Prior to the introduction of the puck concept locating a mask close to a surface presented problems. The use of a puck not only provides for close location of mask 102 but also provides for the puck 101 to be moved in step-and-repeat or synchronous image scanning methods involving holding the mask 102 close to, but not in contact with, the work-piece 103.

FIG. 11

A puck 11 has underside 11A shaped to closely match outer surface 13 of a rotating cylindrical work piece 12. The puck 11 is caused to float relative to the surface 13 of the work piece 12 by a flow of air A directed into the puck 11 in a similar fashion to that described in the Prior Application and passing out of the underside of the puck 11 to cause the puck 11 to float above the surface 13 supported on a cushion of air. The puck 11 will, when floating, follow the surface 13 and compensate for a number of possible errors such as an elliptical, rather than circular work piece 13; giving rise to an incorrectly located centre of rotation; or a support bearing error. Given that the work piece 12 is axially longer (that is to say into the plane of the paper as shown) than the puck 11 then the puck 11 can be driven axially to enable the surface 13 of the work piece 12 to be machined along its length. This provides for close control of focus X of a beam 16 of a machining laser relative to the surface the whole length of the work piece 12. The puck 11 is annular in plan shape having a central bore 14 through which laser beam 16 (typically of ultra violet light) is directed onto the surface 13 of the work piece 12 to provide for machining of the surface 13.

In the above embodiments reference is made to a laser beam being focussed on a point X on the surface of a work piece. The invention is not limited to surface working. The point X can be positioned within the work piece when a work operation requires it.

Industrial Applicability

The above embodiments represent a range of applications for the puck concept. Amongst other things this makes it possible to undertake a particular machining application by using an optimal puck configuration to provide for close tolerances to be maintained while allowing for variations, for example, in work piece geometry.

The invention claimed is:

1. A positioning device for positioning a focusing or imaging lens to a working datum position at a predetermined distance relative to a first surface of a work piece in micro-machining by a laser beam, said laser beam being focused by the focusing or imaging lens onto the first surface of the work piece, said positioning device comprising a distance sensing device comprising a body member riding on a fluid cushion on the first surface of the work piece, said fluid cushion being established by a flow of fluid such as to maintain the body member at a predetermined distance from said first surface,
wherein the body member is incorporated into a closed circuit gas system by which the body member is used to establish said flow of fluid to provide said fluid cushion,
a heat transfer means is provided which is incorporated in the closed circuit gas system to provide for heat exchange between the heat transfer means and gas flowing around the closed circuit gas system for controlling a temperature of the surface of the work piece during the micro-machining and said positioning device being configured such that, in the event that the body member is displaced due to a variation in thickness of the work piece, any change in position of said body member, Perpendicular to the first surface, moves the focusing or imaging lens so as to cause a corresponding change in a current datum position of the focusing or imaging lens to restore the current datum position to the working datum position.

2. The positioning device according to claim 1, wherein the body member is coupled to the focusing or imaging lens and a mask to provide for close following of a surface of a workpiece so as to keep a magnified image of the mask stable; the combination of the body member, the focusing or imaging lens and the mask forming a unit counterbalanced by a counterweight acting to provide for adjustment of focus of the laser beam relative to the surface of the work-piece.

3. The positioning device according to claim 1, wherein the body member of the distance sensing device includes a column supporting a focusing or imaging lens unit above the surface of a work piece; the column being fed gas from the closed circuit gas system and comprising an aperture at the foot of the column such as to establish the fluid cushion enabling to support the body member at a closely specified clearance above the work piece; the focusing or imaging lens unit providing for focusing the laser beam at a point on the surface of the work piece.

4. The positioning device according to claim 3, wherein the body member includes a further column which in combination with the column serves to support the lens unit above the surface of a work piece; the further column is fed gas from the closed circuit gas system; the further column is provided with an aperture at the foot of the further column; the column and the further column in combination serving to support the body member at a closely specified clearance above the work piece; the lens unit providing for focusing of the laser beam at a point on the surface of the work piece.

5. The positioning device according to claim 1, wherein the body member is provided with an inlet pipe for a gas flow and an outlet pipe to provide for an extraction flow from the body member separately from the closed circuit gas system.

6. The positioning device according to claim 1, wherein the closed circuit gas flow system is fed into and passes out of the body member by at least two inlets and two outlets.

7. The positioning device according to claim 1, having a body member incorporating an electrostatic device for positioning close to a surface of a work-piece.

8. The positioning device according to claim 7, wherein the body member is fabricated from an insulating material.

9. The positioning device according to claim 1, wherein the distance sensing device locates a contact mask at a very small distance from the work-piece close to, but not in contact with, the work surface.

10. The positioning device according to claim 1, wherein the body member is shaped to closely correspond to a curved surface of a work piece so as to cause the body member to float relative to the surface of the work piece by the gas flow of air so as to enable the body member to compensate for manufacturing errors in the work piece.

11. A positioning device for a focusing lens that focuses a laser beam, which is emitted by a laser, at a working datum position on a surface of a work piece for micro-machining the work piece with the laser, the positioning device comprising:
a distance sensing device comprising a body memberthat communicates with the focusing lens, the body member comprising a central aperture through which the laser beam passes, a gas inlet aperture, a gas return aperture and at least one gas outlet aperture;
a closed circuit gas system comprising a delivery conduit and an evacuation conduit, the delivery conduit mates with the gas inlet aperture of the body member to supply the body member with a flow of gas, the evacuation conduit mates with the gas return aperture to direct a first portion of the flow of gas from the body member to the closed circuit gas system, the at least one gas outlet aperture of the body member is aligned with the work piece to direct a second portion of the flow of gas from the body member at the surface of the work piece;
the second portion of the flow of gas from the body member directed at the surface of the work piece establishes a fluid cushion between the body member and the surface of the work piece and maintains the body member at a predetermined distance from the surface, such that any change in the predetermined distance perpendicular to the surface induces corresponding movement of the focusing lens to maintain the focus of the laser beam at the working datum position on the surface of the work piece; and
the closed circuit gas system comprises a heat exchanger which either heats or cools the flow of gas supplied to the body member through the delivery conduit and the gas inlet aperture to control a temperature of the surface of the work piece during micro-machining.

12. The positioning device according to claim 11, wherein the body member comprises first, second, third and fourth gas outlet apertures arranged radially about the body member, the first and the third gas outlet apertures are arranged on the body member opposite each other and define a diametrical line that is normal to a diametrical line that is defined by the second and the fourth gas outlet apertures that are arranged on the body member opposite each other, the arrangement of the first, the second, the third and the fourth gas outlet apertures about the body member facilitate adjusting at least one of lateral movement of the body member along the surface of the work piece and a direction of debris extraction from the surface of the work piece.

13. The positioning device according to claim 11, wherein the body member further comprises at least one gas bore which is open to the central aperture and which directs a further portion of the flow of gas to the central aperture and toward the surface of the work piece.

14. The positioning device according to claim 11, wherein a pump is located within the gas system and coupled to the delivery conduit and the evacuation conduit, the pump operating to feed the flow of gas into and extract the flow of gas from the body member.

15. The positioning device according to claim 11, wherein the body member comprises a pair of columns and each of the columns has one of the at least one gas outlet apertures, the columns are supported on opposite lateral sides of the body member and the focusing lens, each of the columns comprises a gas inlet aperture which mates with the delivery conduit and receives the flow of gas, the pair of columns direct the flow of gas out a respective gas outlet aperture at the surface of the work piece to support the body member at a closely specified clearance above the surface of work piece.

16. A positioning device for a focusing lens that focuses a laser beam, which is emitted by a laser, at a working datum position on a surface of a work piece for micro-machining the work piece with the laser, the positioning device comprising:

a distance sensing device comprising a body member that communicates with the focusing lens, the body member comprising a central aperture through which the laser beam passes, a gas inlet aperture, a gas return aperture and at least one gas outlet aperture, the gas inlet aperture, the gas return aperture and the at least one gas outlet aperture being in fluid communication with each other;

a closed circuit gas system being connected to the gas inlet aperture and the gas return aperture of the body member, the gas system comprising a gas pump and a heat exchanger, the gas pump directs a flow of gas to the body member through the gas inlet aperture and removes a flow of gas from the body member through the gas return aperture, the at least one gas outlet aperture being located on the body member adjacent the surface of the work piece to direct an axial flow of gas at the surface of the work piece;

a fluid cushion being formed between the body member and the surface of the work piece by the axial flow of gas as the axial flow of gas impinges on the surface of the work piece, the fluid cushion maintains the focus of the laser beam at the working datum position on the surface of the work piece; and the heat exchanger either heats or cools the flow of gas, directed through the gas inlet aperture, and the axial flow of gas to control a temperature of the surface of the work piece during micro-machining.

\* \* \* \* \*